(12) United States Patent
Schmidt et al.

(10) Patent No.: US 7,996,577 B2
(45) Date of Patent: Aug. 9, 2011

(54) AUTOMATICALLY SWITCHING CONSOLE CONNECTION

(75) Inventors: Eric R. Schmidt, Cupertino, CA (US); Dattatri Mattur, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 12/269,850

(22) Filed: Nov. 12, 2008

(65) Prior Publication Data

US 2010/0121996 A1    May 13, 2010

(51) Int. Cl.
*G06F 3/00* (2006.01)
(52) U.S. Cl. ............. 710/8; 710/11; 710/14; 709/220; 709/221; 709/222
(58) Field of Classification Search .............. None
See application file for complete search history.

(56) References Cited

U.S. PATENT DOCUMENTS

| | | | |
|---|---|---|---|
| 7,126,716 B1 * | 10/2006 | Kaufman et al. | 358/1.18 |
| 7,529,868 B2 * | 5/2009 | Brooks et al. | 710/62 |
| 2003/0167345 A1 * | 9/2003 | Knight et al. | 709/249 |

OTHER PUBLICATIONS

Anonymous, Method for an inter-routing protocol conformance device, Aug. 9, 2006, IP.com, pp. 1-4.*

* cited by examiner

*Primary Examiner* — Eron J Sorrell (74) *Attorney, Agent, or Firm* — Brinks Hofer Gilson & Lione (57) ABSTRACT

A method and system for configuring a network device is provided. In one implementation the method and system may include directing, via a multiplexer, a group of signals defined by a serial communication format from a primary serial configuration interface to a communication port in a CPU. A universal-serial-bus-to-serial (USB) signal may be detected at a USB interface and converted by a USB-to-serial converter circuit to the serial communication format and directed, via the same multiplexer, to the universal-asynchronous-receiver-transmitter instead of the serial signals from the primary serial configuration interface. A detection signal may be communicated from the USB-to-serial converter circuit to the multiplexer. Alternatively, the detection signal may be directed to the CPU, which may then communicate a selection signal to the multiplexer.

23 Claims, 6 Drawing Sheets

AUTOMATICALLY SWITCHING CONSOLE CONNECTION

BACKGROUND

I. Field

The present embodiments relate to console interfaces on computer equipment. Specifically, the present embodiments relate to a method and system for automatically switching between console interfaces.

II. Background of Technology

Network devices, such as routers, switches, and hubs, are utilized within networks to route data between computers operating on the networks. Network devices typically include a number of network ports that are connected to computers or to other networks. Many network devices include other functionality as well. For example, some network devices include a DHCP server that enables dynamically assigning an IP address to a computer connected to the network device.

A network device may require some configuration before becoming operational. For example, it may be necessary to configure a base IP address for a DHCP server operating on the network device. The network device may include a web server that enables configuring the network device via a web browser operating on a computer within the network. However, in some cases, the network interface on the network device may require configuration before becoming functional. To address this, some network devices include a serial port for interfacing directly with a computer serial port. Once connected, the network device may be configured via an application, such as Microsoft® HyperTerminal.

However, as computers have become smaller, computer manufactures have limited the number of interfaces to only the most popular. As a result, fewer and fewer computers include a serial port for enabling serial communications.

BRIEF DESCRIPTION

DETAILED DESCRIPTION

The embodiments below describe network devices. The network devices may be configured by a computer via both a serial port interface, such as an RS-232 port, and a universal-serial-bus (USB) interface. Internal circuitry of each network device enables converting signals from the USB interface to a format suitable for a serial communication port in a processor within the network device through which the network device is configured. The internal circuitry enables the use of processors that do not internally support USB signals. One advantage of this approach is that the network device may be configured from newer computers that may only have USB interfaces, while remaining compatible with older computers that may only have serial port interfaces. Another advantage is that the processor within the network device need not directly support USB signals.

Although reference is made to configurable network devices, such as network routers, one of ordinary skill will appreciate that the embodiments described may be applied to other types of electronic equipment that may benefit from having a configuration interface as described below.

In one implementation, the network device may direct, via a multiplexer, a group of signals defined by a serial communication format from a primary serial configuration interface to a universal-asynchronous-receiver-transmitter (UART) in communication with a CPU. A universal-serial-bus (USB) signal may be detected at a USB interface and converted by a USB-to-serial converter circuit to the same serial communication format as above. The converted USB signal may then be directed, via the same multiplexer, to the UART instead of the primary serial configuration interface signals. A detection signal may be communicated from the USB-to-serial converter circuit to the multiplexer. Alternatively, the detection signal may be directed to the CPU, which may then communicate a selection signal to the multiplexer.

Figure 1:
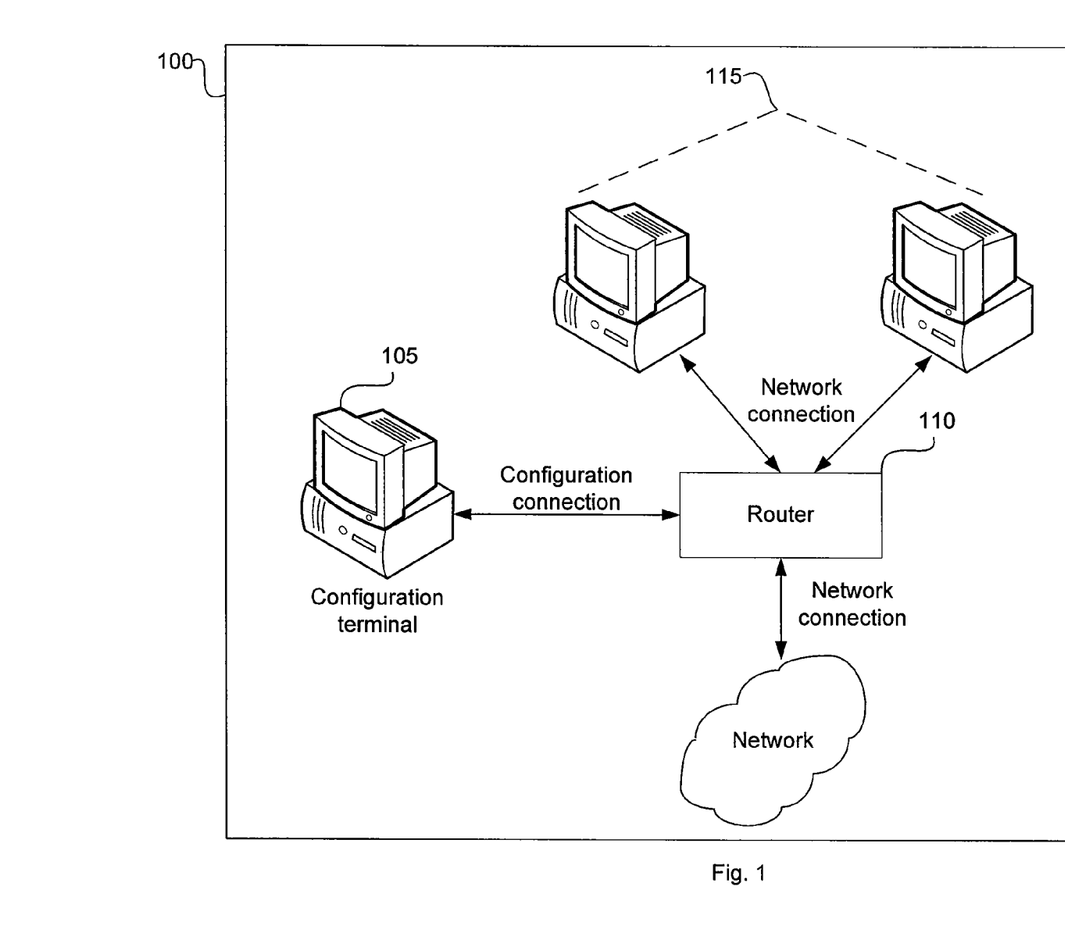
FIG. 1 is a schematic representation of a router based network system.

FIG. 1 is a schematic representation of a router-based network system 100. The network system 100 includes a configuration terminal 105, networked computers 115, and a network device 110.

The configuration terminal 105 and networked computers 115 may correspond to any device capable of communicating information. For example, the configuration terminal 105 and networked computers 115 may correspond to any conventional computer or other data processing device, such as an Intel®, AMD®, or PowerPC® based computer operating a Microsoft Windows®, Linux, or other Unix® based operating system. The configuration terminal 105 and networked computers 115 may include networking hardware and software that enables communications with other equipment on the network, such as the network device 110.

The configuration terminal 105 may be adapted to communicate to electronic equipment via interfaces other than the network interface, such as a serial port interface, universal-serial-bus (USB) port interface, parallel port interface, or SCSI port interface. A console application may reside on the configuration terminal 105 and may enable sending text-based commands and data via the interfaces. The console application is a computer program designed to be used via a text-only computer interface, such as a text terminal, the command line interface of an operating system, or the text-based interface included with some Graphical User Interface (GUI) operating systems, such as Microsoft® HyperTerminal included with Microsoft Windows®. A user typically interacts with a console application using a keyboard and display screen, as opposed to GUI applications, which normally require the use of a mouse or other pointing device. Other interaction mechanisms may be used, such as a mouse or pointing device. In the present embodiment, the configuration terminal 105 utilizes a serial port interface and/or USB port interface to configure the network device 110.

The network device 110 may include logic, code, and/or circuitry that enables routing communications from one computer to another, or for routing communications between networks. For example, the network device 110 may correspond to a network router that includes several network port interfaces for connecting to computers or other networks. The interfaces may correspond to 10/100 RJ-45 Ethernet ports adapted for Internet communications or other ports.

The network device 110 may include various applications to facilitate the communications. For example, the network device may include a DHCP application for automatically assigning IP addresses to computers in communication with the network port interfaces. To facilitate configuring such applications, the network device 110 may be operative to communicate a configuration web page. A user may navigate to the web page utilizing an internet browser and may specify the configuration information.

The network device 110 may also include various configuration port interfaces that may be utilized to configure the network device 110. For example, the network device 110 may include a USB port interface and/or a serial port interface that may be utilized to configure the network device 110. In the present embodiment, the network device 110 is configured, via these interfaces, by the configuration terminal 105.

Figure 2:
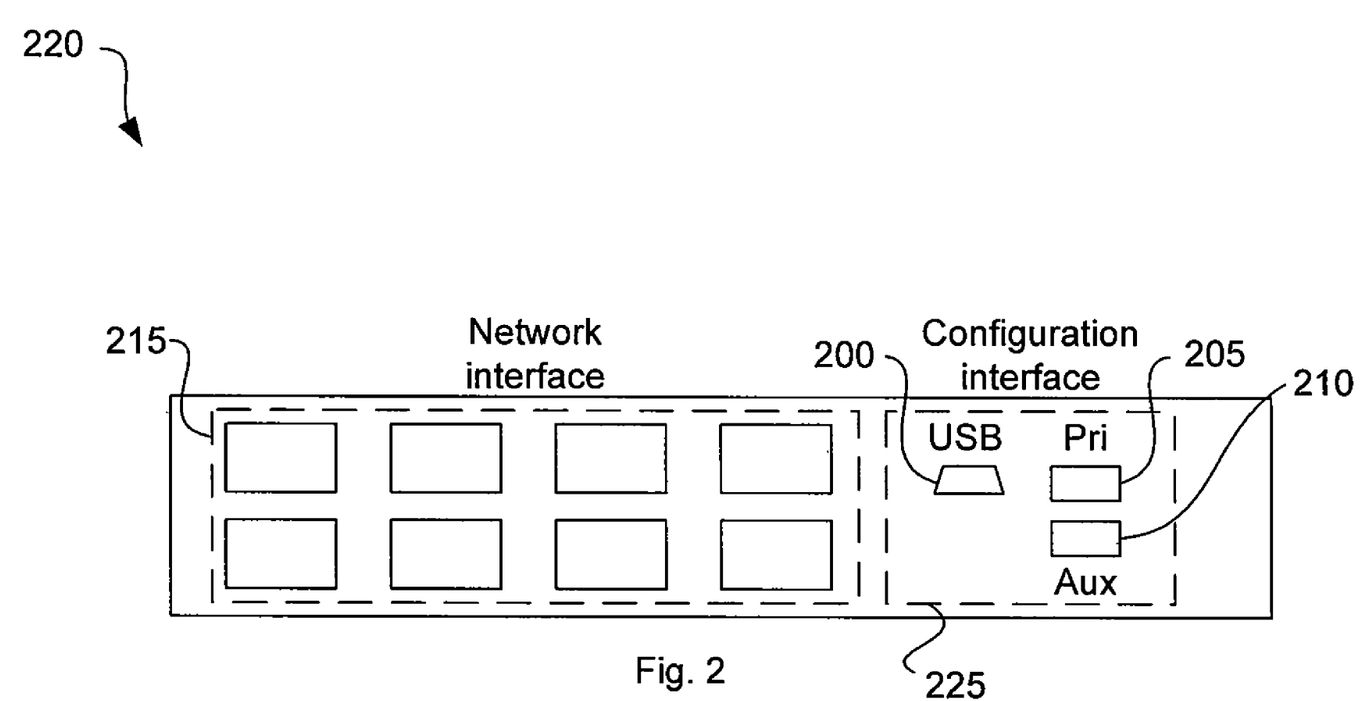
FIG. 2 shows the interface portion of a network device.

FIG. 2 shows the interface portion of a network device 220. The network device 220 may correspond to the network device 110 of FIG. 1. The interface may include network interfaces 215 and configuration interfaces 225. The network interfaces 215 may correspond to 10/100 RJ-45 ports and may be utilized to connect the router to computers or other networking equipment. For example, the networked computers 115 of FIG. 1 may be connected to the network device 220 via the network interfaces 215.

The configuration interfaces 225 include a USB interface 200, a primary serial interface 205, and an auxiliary serial interface 210. The USB interface connector may correspond to a USB-A, USB-B, Mini-B, Micro-AB, or Micro-B type connector. The USB interface may include power and data lines. The power lines may be utilized to power the network device 220 and/or to detect the insertion of a USB cable coupled to a computer's USB interface. The USB data lines may carry commands and data that may be utilized to configure the network device 220.

The primary serial interface 205 and auxiliary serial interface 210 may be utilized to configure the network device 220 via a serial interface, such as a serial interface on a computer. The serial connector may correspond to a RJ45 type connector or other connector suitable for communicating the signals associated with a serial interface.

Figure 3:
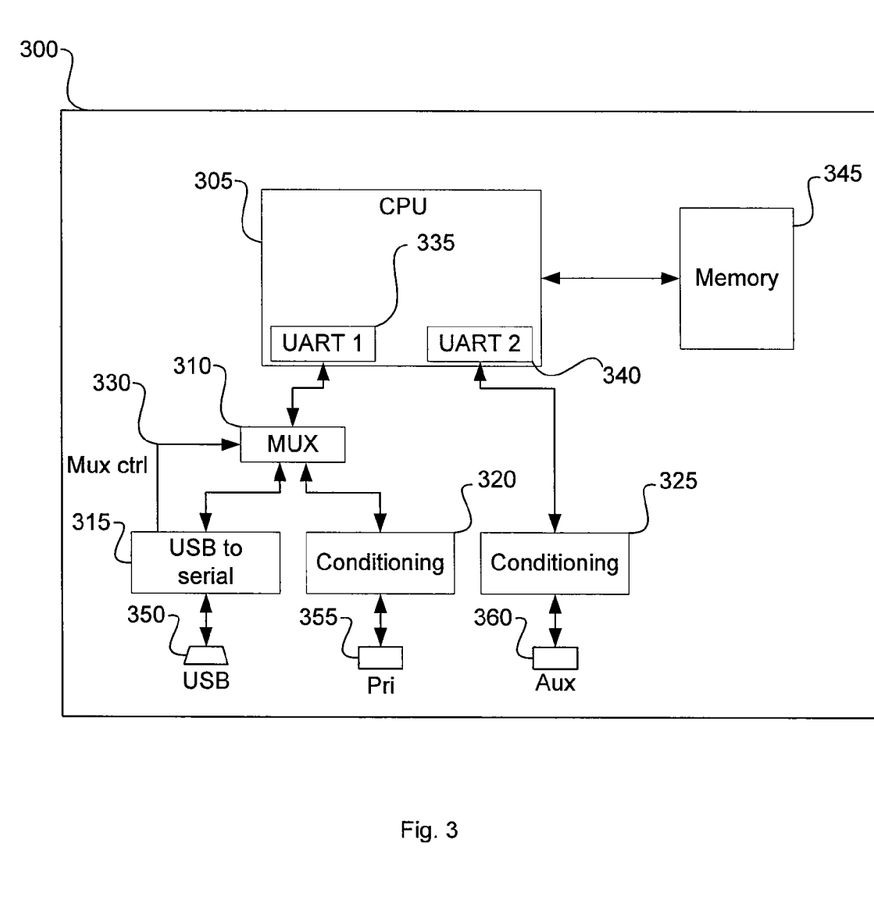
FIG. 3 is a schematic representation of a first embodiment of network device interface circuitry.

FIG. 3 is a schematic representation of a first embodiment of network device interface circuitry 300. The network device interface circuitry 300 includes a CPU 305, a first universal-asynchronous-receiver-transmitter (UART) 335, a second universal-asynchronous-receiver-transmitter (UART) 340, a multiplexer 310, a USB-to-serial converter 315, a primary serial input conditioning circuit 320, an auxiliary serial input conditioning circuit 325, a memory 345, a USB interface 350, a primary serial interface 355, and an auxiliary serial interface 360. Additional, different, or fewer components may be provided, such as not providing the auxiliary path. The network device interface circuitry 300 may reside in the network device 110 of FIG. 1. The USB interface 350, primary serial interface 355, and auxiliary serial interface 360 may correspond to the USB interface 200, primary serial interface 205, and auxiliary serial interface 210 of FIG. 2.

The primary serial input conditioning circuit 320 and auxiliary serial input conditioning circuit 325 may include logic and other circuitry that enables converting signals communicated via the primary serial interface 205 and auxiliary serial interface 360 into signal formats suitable for the internal circuitry of the network device. For example, the primary serial input conditioning circuit 320 and auxiliary serial input conditioning circuit 325 may include level shifting circuitry for converting ±12 Volts communicated from a computer serial interface to a voltage between 0-5 Volts, which may correspond to a voltage range more suitable for the network device circuitry. Surge suppression circuitry for protecting the network device's internal circuitry from electrical transients may be included. For example, various passive and active components, such as diodes, resistors and capacitors, may be utilized to suppress static electricity that may be present at the interfaces.

The primary serial input conditioning circuit 320 interfaces the primary serial interface 355 to the multiplexer 310. The auxiliary serial input conditioning circuit 325 interfaces the auxiliary serial interface 360 to the second UART 340.

The CPU 305 may include logic, memory, circuitry, software, or firmware that enables performing various operations associated with the network device. For example, the CPU 305 may be adapted to direct data from one network interface of the network device to another network interface and also to generate a configuration web page in response to a web page request from a computer connected to one of the network interfaces. The CPU 305 may also be adapted to enable configuring the network device via console applications as described above.

The memory 345 may be a read-only-memory (ROM), random-access-memory (RAM), or non-volatile programmable memory. The memory 345 may include code that is operable to cause the CPU 305 to perform acts associated with the network device. For example, the code may enable directing data from one network interface of the network device to another network interface, generating a configuration web page in response to a web page request from a computer connected to one of the network interfaces, and configuring the network device via console type connections.

The first UART 335 and second UART 340 may include logic and/or other circuitry that enables converting serial data to parallel data and visa versa. The first UART 335 and second UART 340 may be utilized to convert serial data communicated from a configuration interface to a parallel data format more suitable for the CPU 305. For example, configuration information may be communicated to and from the CPU 305 via the USB interface 200, a primary serial interface 205, and/or auxiliary serial interface 210 and may be converted from serial to parallel and visa versa via the first UART 335 and second UART 340.

The first UART 335 and second UART 340 may include a clock generator, input/output shift registers, transmit/receive control logic, and read/write control logic. The first UART 335 and second UART 340 may also include transmit/receive buffers, parallel data bus buffers, and first-in/first-out (FIFO) buffer memory.

The multiplexer 310 may include logic and/or circuitry that enables controlling the signal path of a group of signals. In the present embodiment, the multiplexer 310 operates to direct signals between the USB-to-serial converter 315 and the first UART 335 or between the primary input conditioning circuit 320 and the first UART 335. The multiplexer 310 selects the signals to direct based on the state of a selection signal. For example, when the selection signal is high, the multiplexer 310 may direct signals between the USB-to-serial converter 315 and the first UART 335. When the selection signal is low, the multiplexer 310 may direct signals from the first serial input conditioning circuit 320 to the first UART 335. The multiplexer 310 allows the USB interface 200 and primary serial interface 205 to share the first UART 335 on the CPU 305. Sharing the first UART 335 rather than adding an additional UART and/or integrating USB interface circuitry reduces the pin count on the CPU 305 and, therefore, the cost of the CPU 305. It also provides more flexibility in that the extra components that enable configuration via the USB interface 350 may be easily be removed if it is decided that configuration via a serial interface alone is sufficient. In alternative embodiments, a separate UART is provided for the USB connection without using a multiplexer. The multiplexer 310 may be positioned between the USB interface 350 and primary serial interface 355 and the circuits 315 and 320 in other embodiments.

The USB-to-serial converter 315 may include logic and/or other circuitry that enables converting signals communicated via a USB protocol to a serial protocol and visa versa. For example the USB converter may correspond to a FT232BM USB-to-serial integrated circuit manufactured by Future Technology Devices International Ltd. or other similar device. The USB-to-serial converter 315 may also include circuitry operable to generate a selection signal 330 for controlling the multiplexer 310. The state of the selection signal 330 may indicate whether a USB connection is present. For example, the selection signal 330 may be set to a high state when a USB connection is present and a low state when a USB connection is not present. A USB connection may be detected by sensing a voltage on either the USB power lines or data lines at the USB interface 350. This enables routing signals from the USB-to-serial converter 315 to the first UART 335, and signals from the first UART 335 to the USB-to-serial converter 315, via the multiplexer 310, when a USB cable connected on one end to a computer USB interface is inserted into the USB interface 350.

Figure 4:
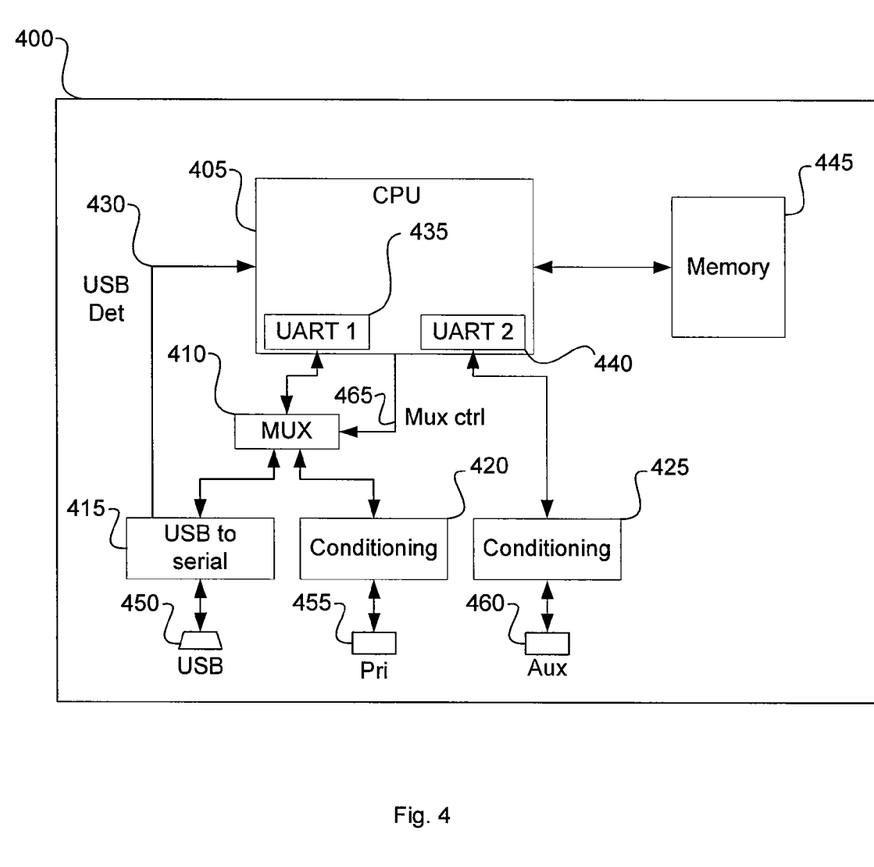
FIG. 4 is a schematic representation of a second embodiment of network device interface circuitry.

FIG. 4 is a schematic representation of a second embodiment of network device interface circuitry 400. The network device interface circuitry 400 includes a CPU 405, a first UART 435, a second UART 440, a multiplexer 410, a USB-to-serial converter 415, a primary serial input conditioning circuit 420, an auxiliary serial input conditioning circuit 425, a memory 445, a USB interface 450, a primary serial interface 455, and an auxiliary serial interface 460. Additional, different, or fewer components may be provided. The network device interface circuitry 400 may reside in the network device 110 of FIG. 1.

The second embodiment of the network device interface circuitry 400 may operate similarly to the first embodiment of the network device interface circuitry 300 of FIG. 3. In addition to the functionality described above, in the second embodiment, a detection signal 430 may be communicated from the USB-to-serial converter 415 to the CPU 405 and the CPU 405 may communicate a selection signal 465 to the multiplexer 410 to control signal selection.

The memory 445 may also include code operable to cause the CPU 405 to detect the signal 430 communicated from the USB-to-serial converter 415 and to cause the CPU 405 to generate a selection signal 465 that may be utilized to control the signal path of a group of signals communicated via the multiplexer 410. For example, the code may cause the CPU 405 to set the selection signal 465 to a high value or low value depending on whether the detection signal 430 indicates the presence of a USB connection. At least one advantage of this approach is that it enables controlling through software whether the USB interface 450 may be utilized to configure the network device. That is, via the code, the feature may be enabled or disabled.

Figure 5:
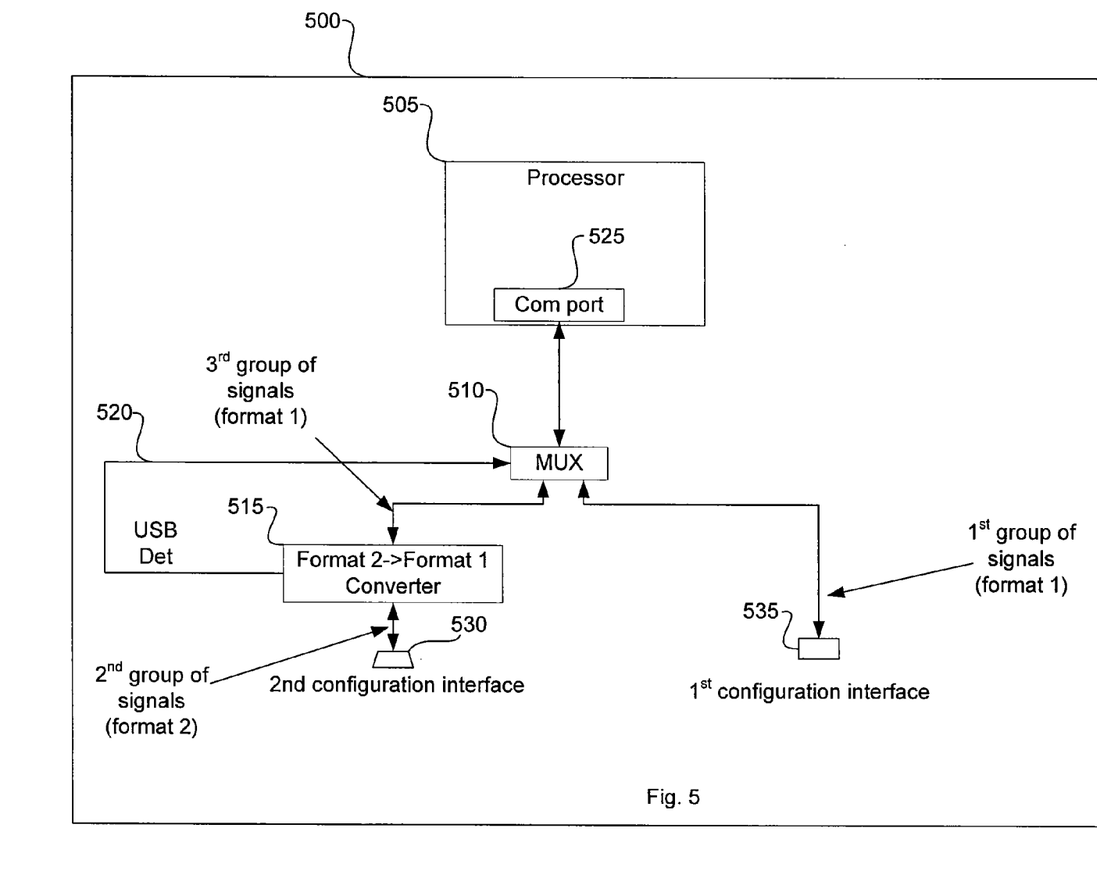
FIG. 5 is a schematic representation of a third embodiment of network device interface circuitry.

FIG. 5 is a schematic representation of a fourth embodiment of network device interface circuitry 500. The network device circuitry 500 includes a processor 505, a communication port 525, a multiplexer 510, a converter circuit 515, a first configuration interface 535, a second configuration interface 530. The network device circuitry 500 may reside in the network device 110 of FIG. 1. The first configuration interface 535 and second configuration interface 530 may correspond to the primary serial interface 205 and USB interface 200, respectively of, FIG. 2.

The processor 505 may include logic, memory, circuitry, software, or firmware that enables performing various operations associated with the network device. For example, the processor 505 may be adapted to direct data from one network interface of the network device to another network interface and also to generate a configuration web page in response to a web page request from a computer connected to one of the network interfaces. The processor 505 may also be adapted to enable configuring the network device via console applications as described above.

The communication port 525 may include logic and/or other circuitry that enables converting serial data to parallel data and visa versa. The communication port 525 may be utilized to convert serial data communicated from a configuration interface to a parallel data format more suitable for the processor 505. For example, configuration information may be communicated to and from the processor 505 via the first configuration interface 535 and/or second configuration interface 530 and may be converted from serial to parallel and visa versa via the first communication port 525.

The first communication port 525 may include a clock generator, input/output shift registers, transmit/receive control logic, and read/write control logic. The first communication port 525 may also include transmit/receive buffers, parallel data bus buffers, and first-in/first-out (FIFO) buffer memory.

The multiplexer 510 may include logic and/or circuitry that enables controlling the signal path of a group of signals. The multiplexer 310 may be operated so as to direct signals between the converter circuit 515 and the communication port 525 or between the first configuration interface 535 and the communication port 525. The multiplexer 510 may select the signals to direct based on the state of a selection signal 520. For example, when the selection signal 520 is high, the multiplexer 510 may direct signals between the converter circuit 515 and communication port 525. When the selection signal 520 is low, the multiplexer 510 may direct signals from the first configuration interface 535 to the communication port 525. The multiplexer 510 allows the first configuration interface 535 and second configuration interface 530 to share the communication port 525. Sharing the communication port 525 rather than adding an additional communication port 525 reduces the pin count on the processor 505 and, therefore, the cost of the processor 505. It also provides more flexibility in that the extra components that enable configuration via the second configuration interface 530 may easily be removed if it is decided that configuration via the first configuration interface 535 alone is sufficient.

The converter circuit 515 may include logic and/or other circuitry that enables converting signals communicated via a first communication format, such as a USB format, to a second communication format, such as a serial format and visa versa. For example, the converter circuit 515 may correspond to a FT232BM USB-to-serial integrated circuit manufactured by Future Technology Devices International Ltd. or other similar device. The converter circuit 515 may also include circuitry operable to generate a selection signal 520 for controlling the multiplexer 510. The state of the selection signal 520 may indicate whether a connection is present at the second configuration interface 530. For example, the selection signal 520 may be set to a high state when a USB connection is present at the second configuration interface 530 and a low state when a USB connection is not present.

Figure 6:
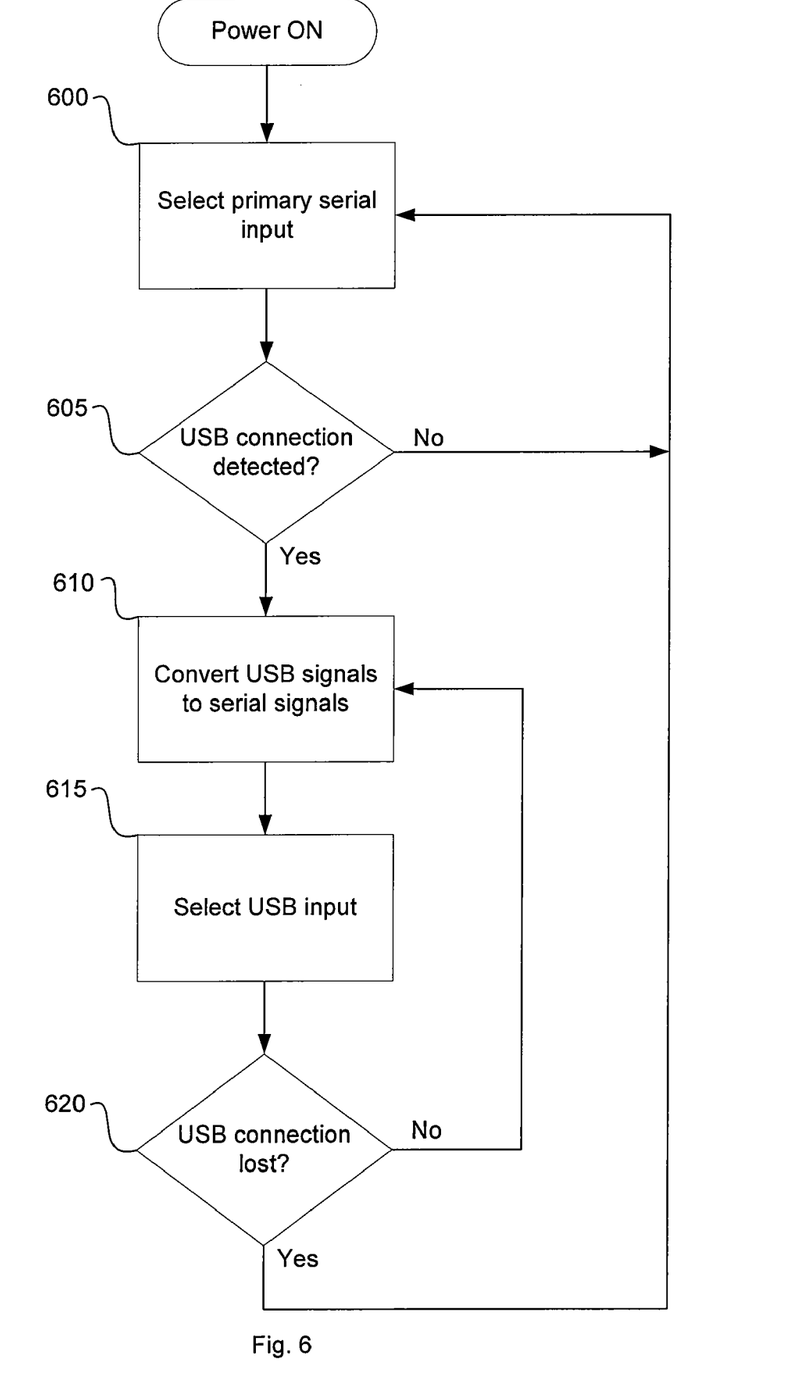
FIG. 6 is a flow diagram for selecting a configuration interface of a network device.

FIG. 6 is a flow diagram for selecting a configuration interface of a network device. The operations described in the flow diagram may be carried out by the first embodiment of the network device interface circuitry 300, shown in FIG. 3, the second embodiment of the network device interface circuitry 400, shown in FIG. 4, or other network device circuits.

At block 600, signals from a serial configuration interface of the network device may be selected and directed to a serial input of a processor. For example, signals communicated from the primary serial interface 205 of FIG. 2 may be directed via the multiplexer 310 of FIG. 3, to a serial input port of a processor, such as the first UART 335 in the CPU 305. The network device may then be configured via the primary serial interface 205 of the network device. For example, the serial port of a computer may be connected to the primary serial interface 205 of the network device. Then, via a console application, such as Microsoft® HyperTerminal, the network device may be configured.

At block 605, if a USB connection is detected, then at block 610, USB data signals may be converted to serial data signals suitable for a UART. For example, a USB connection may be detected by sensing a voltage on either the USB power lines or data lines at the USB interface 350 of FIG. 3. Once detected, the USB data signals may be converted to serial data signals suitable for a UART via a USB-to-serial conversion circuit, such as an FT232BM or similar device.

Alternatively, the USB data signals may be converted to serial data first and the USB connection may be detected by sensing valid data communications over the USB data lines.

At block 615, the converted USB signals may be directed to a serial port interface of a processor. For example, signals from the USB-to-serial conversion circuit may be directed via the multiplexer 310 to the first UART 335, as shown in FIG. 3. In addition, signals from the first UART 335 may be directed, via the multiplexer 310, to the USB-to-serial conversion circuit. This enables configuring the directed via computers that only have a USB port.

At block 620, if the USB connection is lost, then at block 600, signals from the primary serial interface 205 may be selected and directed to the first UART 335 and the network device may again be configured via the primary serial interface 205.

From the foregoing, it may be seen that the embodiments disclosed herein provide an approach for configuring a network device from a computer USB interface. For example, a USB connection may be utilized to configure the network device via an existing serial interface within the network device, such as a UART. Signals communicated via the USB connection may be converted to a format suitable for the serial interface via a USB-to-serial converter. The converted signals may then be communicated via a multiplexer to the serial interface. Alternatively, the network device may be configured via a computer serial port interface by connecting the serial port interface of the computer to a primary or auxiliary serial port interface on the network device. This approach allows the network device to be configured from newer computers that may only have USB interfaces, while remaining compatible with older computers that may only have serial port interfaces. While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

We claim:

1. A method for configuring a network device configured to receive a first group of signals at a first configuration interface using a first communication format and a second group of signals at a second configuration interface using a second communication format, the method comprising:
   detecting, at the second configuration interface, the second group of signals defined by the second communication format;
   switching a communication port from communication with the first configuration interface to communication with the second configuration interface;
   converting the second group of signals into a third group of signals having the first communication format;
   directing the third group of signals to the communication port; and
   routing data on a network based on a configuration provided by the third group of signals.

2. The method according to claim 1, further comprising configuring the network device via the second interface.

3. The method according to claim 1, wherein the communication port includes a universal-asynchronous-receiver-transmitter.

4. The method according to claim 1, wherein the first communication format corresponds to a serial data format.

5. The method according to claim 1, wherein the second communication format corresponds to universal-serial-bus format.

6. The method according to claim 1, wherein the second group of signals are converted to the third group of signals via a universal-serial-bus-to-serial converter circuit.

7. The method according to claim 6, wherein a detection signal from the universal-serial-bus-to-serial converter circuit controls a selection input of a multiplexer.

8. The method according to claim 6, wherein a detection signal from the universal-serial-bus-to-serial converter circuit is communicated to a processor and the processor controls a selection input of a multiplexer.

9. A machine-readable storage medium having stored thereon, a computer program comprising at least one code section for configuring a network device, the at least one code section being executable by a machine for causing the machine to perform acts of:
   directing a first group of signals defined by a first communication format from a first configuration interface to a communication port adapted to communicate via the first communication format;
   detecting, at a second configuration interface, a second group of signals defined by a second communication format;
   converting the second group of signals into a third group of signals defined by the first communication format;
   directing the third group of signals to the communication port instead of the first group of signals; and
   routing data on a network based on a configuration provided by the group of signals.

10. The machine-readable storage according to claim 9, wherein the at least one code section enables configuring the network device via the second interface.

11. The machine-readable storage according to claim 9, wherein the communication port includes a universal-asynchronous-receiver-transmitter.

12. The machine-readable storage according to claim 9, wherein the first communication format corresponds to a serial data format.

13. The machine-readable storage according to claim 9, wherein the second communication format corresponds to universal-serial-bus format.

14. The machine-readable storage according to claim 9, wherein the second group of signals are converted to the third group of signals via a universal-serial-bus-to-serial converter circuit.

15. The machine-readable storage according to claim 14, wherein a detection signal from the universal-serial-bus-to-serial converter circuit controls a selection input of a multiplexer.

16. The machine-readable storage according to claim 14, wherein a detection signal from the universal-serial-bus-to-serial converter circuit is communicated to a processor and the processor controls a selection input of a multiplexer.

17. A network device comprising:
a multiplexer operable to direct a first group of signals defined by a first communication format from a first configuration interface to a communication port adapted to communicate via the first communication format;
a universal-serial-bus-to-serial converter circuit operable to detect, at a second configuration interface, a second group of signals defined by a second communication format and operable to convert the second group of signals into a third group of signals of the first communication format; wherein the multiplexer is operable to direct the third group of signals to the communication port instead of the first group of signals; and
a network interface configured to route network traffic based on the third group of signals.

18. The network device according to claim 17, wherein the network device is configurable via the second interface.

19. The network device according to claim 17, wherein the communication port includes a universal-asynchronous-receiver-transmitter.

20. The network device according to claim 17, wherein the first communication format corresponds to a serial data format.

21. The network device according to claim 17, wherein the second communication format corresponds to universal-serial-bus format.

22. The network device according to claim 17, wherein a detection signal from the universal-serial-bus-to-serial converter circuit controls a selection input of the multiplexer.

23. The network device according to claim 17, wherein a detection signal from the universal-serial-bus-to-serial converter circuit is communicated to a processor and the processor controls a selection input of the multiplexer.

* * * * *